United States Patent Office 3,220,565
Patented Nov. 30, 1965

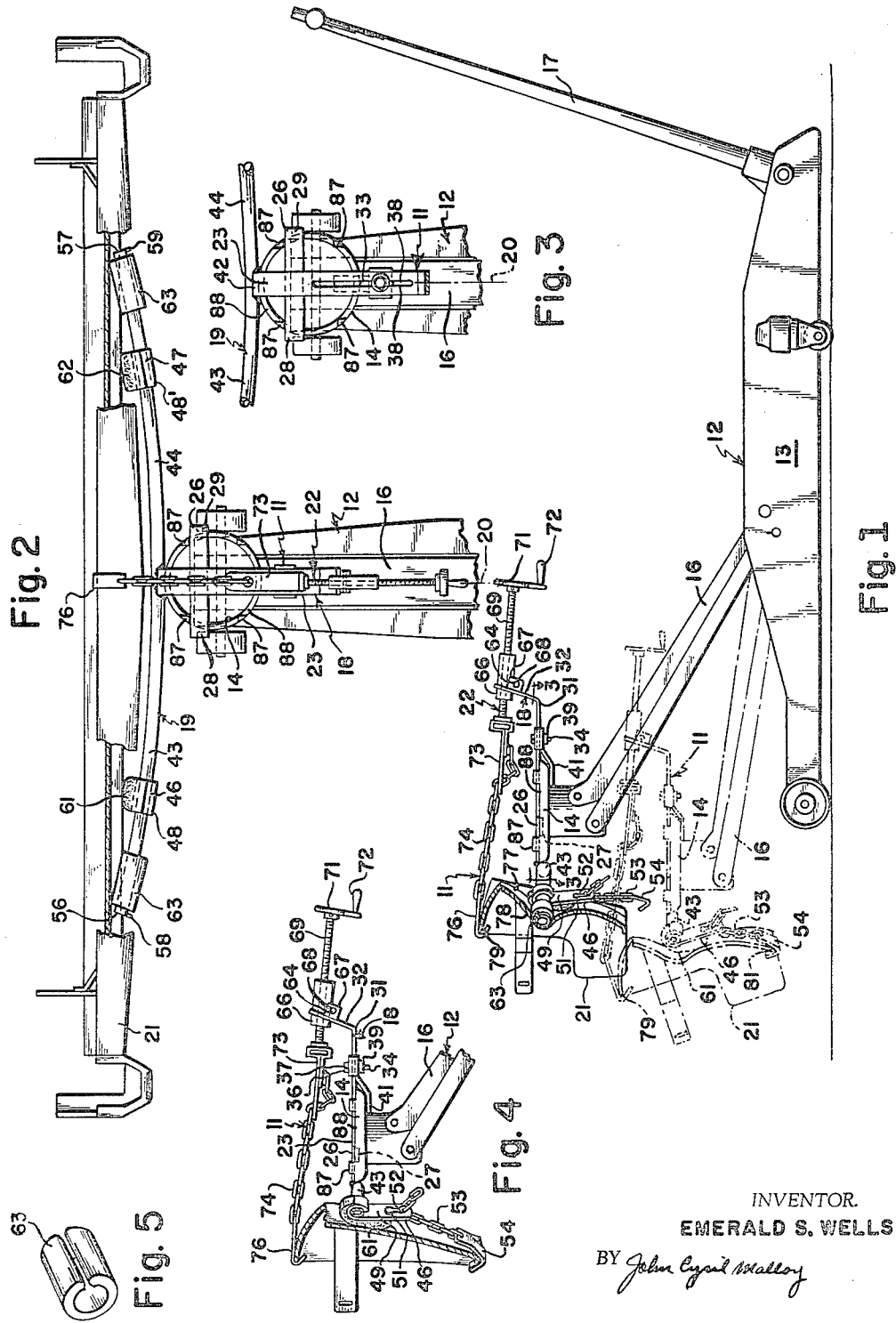

3,220,565
BUMPER HOISTING FIXTURE
Emerald S. Wells, 16901 NW. 37th Ave., Miami, Fla.
Filed Nov. 4, 1963, Ser. No. 321,036
8 Claims. (Cl. 214—1)

This invention relates to a fixture adapted to be utilized with automobile jacks of the type commonly used in auto body repair shops for the purpose of installing automobile bumper components.

As is perhaps well known, the size, shape and weight of automobile bumpers varies within wide ranges; many of the bumpers are too heavy and awkward to be installed by one man and require that one man hold a bumper being installed in position while a second man fastens it to an automobile body. The instant invention provides a fixture adapted to be used with conventional automobile jacks so that a bumper installation job may be performed by one man in auto body repair shops.

It is, accordingly, an object of this invention to provide a fixture for automobile jacks commonly used in auto body repair shops which is adapted to be utilized for the installation of bumpers on automobiles.

It is a general object of this invention to provide an automobile bumper fixture which is adapted to be used by an auto jack which is relatively inexpensive to manufacture, simple in construction and adapted to handle a wide range of shapes, sizes and weights of various model bumpers.

In accordance with these and other objects which will become apparent hereinafter, the instant invention will now be described with reference to the accompanying drawings illustrating a preferred embodiment thereof.

In the drawings:

FIG. 1 is a side elevation view partly in cross section of the fixture attached to a conventional jack used in auto body repair shops and illustrating a bumper having a contoured face in the position for installation on an automobile, which bumper has been lifted in a manner to be described from a position shown in chain-dot line;

FIG. 2 is a plan view of FIG. 1 which is partly broken away;

FIG. 3 is a partial plan view partly in cross section taken along the line 3—3 of FIG. 1 and looking in the direction of the arrows;

FIG. 4 is a partial side elevation view of the fixture and jack of FIG. 1 with a relatively smooth faced auto bumper illustrated thereon and partly in cross section; and FIG. 5 is a perspective view of an element which may be included in the instant invention and which is explained hereinafter.

Referring more particularly to the drawings, wherein like reference characters designate like or corresponding parts throughout the different views, and referring particularly to FIG. 1, 11 generally designates a bumper hoisting fixture adapted to be attached to a conventional jack 12 of the type commonly used in auto repair shops, the instant type of jack including a wheeled base 13, a lift plate 14, and means and a member 16 responsive to manipulations of the handle 17 to raise and lower the lift plate. The fixture 11 includes (1) a member 18 adapted to be removably fastened to the lift plate for vertical movement therewith, (2) a horizontally-aligned support member 19 which in use is transversely disposed with respect to the main centerline 20 of the jack to support a bumper 21, and (3) adjustable means 22 carried on the member 18 to rotate a supported bumper about a longitudinal centerline thereof.

With particular reference to the numeral 18, it includes (1) a rigid strip of metal 23 which, when attached to a jack, is aligned with the main jack centerline 20 and is horizontally disposed and supported by the lift plate 14 and, (2) a horizontally-aligned and transversely-disposed crossbar 26 supported intermediate the length of the strip 21. The said crossbar 26 is provided with depressed medial portion 27 for receiving the strip therein with the distal portions 28 and 29 of the crossbar being in substantially the same plane as the strip 23. The member 18, comprising the aforesaid crossbar 26 and strip 23, is supported on the conventional auto jack lift pltae in a manner to be described. To the rearward end 31 of the strip a standard 32 is supported and, adjacent the standard, an elongated slot 33 is provided in the strip. The threaded stem 34 of a headed bolt 36 is received through the slot 33 and extends downwardly, the bolt 36 being slidable in the slot 33 along the length thereof and being supported by the marginal edges 38 of the slot which are in engagement with the underside of the head 37 of the bolt 36. The threaded stem 34 of the bolt 36 is received in a threaded nut 39 disposed beneath the strip 23, which nut is welded, or otherwise suitably fastened, to a clamp 41 that normally is in depending relation to the strip and is slidable together with the bolt 36 whereby the position of the clamp 41 is adjustable along the length of the slot 33 in the strip 23.

The transversely-disposed member 19 is arcuate in shape and is medially fastened in rigid relation to the forward end 42 of the strip 23 defining a pair of extending arms 43 and 44 of equal length which forwardly diverge. Slidably adjustable along the length of each arm, carrier members 46 and 47 are provided, each of said carrier members comprising a hooked portion 48 and 48' with a depending chain-receiving portion 49 in which a hole 51 with a radial slot 52 is provided. The hole 51 is round and of sufficient diameter to permit a chain 53 to be passed therethrough which is adapted to be fastened to the carrier member with one of the individual links of each chain being captively received in the radial slot of the respective chain-receiving portions. A short length of chain, such as 53, is provided and a link of each is captivated in the respective radial slots of each carrier member with the distal end of each length being provided with a hook 54. The distal ends 56 and 57 of each arm 43 and 44 are provided with a key 58 and 59, each of which is adapted to permit the carrier members 46 and 47 to be passed thereover when rotated to align the passageway between the hooked portion and the chain-receiving portion for detachable attachment of the carrier members to the arms and for normally restraining them from sliding off the arms. Overlaying the forwardly facing surface of each carrier member a pad, such as 61 and 62, is fastened for a purpose to be explained. Additionally, a pad such as 63 slidable along the length of each arm will be provided; the said pads may comprise a short length of hose material as seen in FIG. 5.

The adjustable means 25 are pivotally supported as at 64 to the upper end of the standard 32, which end is bifurcated. As shown, an interiorly threaded sleeve 66 carrying opposed trunnions 67 are received in confronting holes 68 on the bifurcated standard end and through the threaded sleeve 66 a threaded member 69 is adapted to be threadably passed by turning a wheel 71 and crank 72 which are keyed for rotation at one end. To the other end of the member 69 a chain-receiving plate 73 is fastened by means of a swivel mount permitting translational movement only of the plate 73. In the plate 73 a hole with a radial slot for receiving a chain 74 is provided, the said chain having a hook 76 at the distal end.

Before describing the operation of the tool, reference is made to the bumper 21 shown in FIGS. 1 and 2 of the drawings which is adapted to be fastened to the end of an auto with the front contoured face 77 of the bumper extending outwardly in cross section and with the rear face 78 including spaced, generally parallel, transversely-extending upper and lower lips 79 and 81 respectively which open toward the auto. The design of many current model bumpers is quite complicated with the result that the bumpers are heavy and awkard in installation requiring one man to hold the bumper in position so that another man may insert fasteners for attaching the bumper to an automobile body in precisely the proper place. The instant fixture is adapted to be fastened, in a manner to be described, to the lift plate of an automobile jack to receive a bumper adjustably fastened to the fixture so that one man using the tool may raise the bumper to the proper height, adjust it by rotating it about an axis parallel to the longitudinal axis of the bumper, and move the jack to the correct position with respect to an automobile, so that the same man may fasten it thereto.

The operation of attaching the fixture to the lift plate of a jack will now be described. Generally, jack lifting plates are provided with spaced, vertical projections 87 which extend upwardly from a lip 88 defining the dish-shaped, centrally recessed plate 14. The member 18 is positioned over the lift plate with the ends 28 and 29 of the crossbar 26 and the strip ends being supported on the upper surface of the lip 88, between the spaced projections. The front end 42 of the strip 23 is positioned in abutting relation with the front of the lift plate with the strip 23 being in parallel alignment with the centerline 20 of the jack; and the clamp 34 is slidably adjusted with respect to the slot 33 and fastened by means of the bolt 36 into clamping engagement above and below the rear of the lift plate. When thus attached, the support member 19 is transversely disposed with the arms extending outwardly and diverging forwardly in a horizontal plane with respect to the lift plate.

The attachment of the bumper shown in FIGS. 1 and 2 to the transverse member 19 of the fixture will now be described. By manipulation of the handle 17 and consequently the means 16, the lift plate 14 is moved to a position adjacent the surface on which the wheeled base 13 is adapted to be traveled and a bumper 21 is positioned with its front face 77 toward the arms 43 and 44 of the transverse member 19. In the event that the bumper is contoured such as that shown in FIGS. 1 and 2, the underside of the outwardly projecting contoured portion is nested against pads 61 and 62 overlaying the slidably adjustable carrier members 46 and 47 and the length of the hooked chains 53 are adjusted by placing the appropriate link in the slot 52 of each carrier member following which the hooked end 54 is positioned as shown in FIG. 1 over the lip 81. The hooked chain 74 at the top is fastened to the upper lip 79 and the wheel and crank 71 and 72 are turned until the bumper 21 is rotated about a longitudinal, transversely, aligned axis until it is aligned such that the rear face is adapted to confront a car in the precise attitude required for attachment thereto. The handle 17 of the jack is then manipulated to raise the lift plate and bumper to the correct height whereupon the jack with the fixture and bumper attached may be wheeled into position so that bolts or other suitable fasteners may be readily utilized to fasten the bumper to an auto. The pad 63 may be adjusted with respect to each arm to avoid scarring the front face of the bumper as can be seen in FIG. 1; the lower chains and the hook 54 are not actually required for a contoured bumper when it has been correctly positioned, that is, in the right attitude for attachment to a car, for the reason that it is supported with respect to vertically aligned forces by the carrier members 46 and 47. With respect to FIG. 4, the hooked chain 54 is required to support bumpers of the type which do not have sharply contoured front faces whereby the bumper may be supported with respect to the vertical forces by the carrier members.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. For use with a jack having a wheeled base, a vertically movable lift plate and means to raise and lower the lift plate; a portable tool for holding transversely-disposed bumped components for installation to the end of an auto body, the tool comprising; a first member carrying means to removably fasten said first member to the lift plate of a jack for vertical movement; a transverse member rigidly fastened to the first member and having distal outwardly diverging arms; first adjustable means supported on the arms to hold and support a bumper component on one side of the arms; and second adjustable means for rotating a bumper component about its main longitudinal axis, said adjustable means being supported by the first member on the other side of the arms.

2. A tool as set forth in claim 1 wherein the means carried by the first member comprise a clamp to hold the lift plate between the first member and the clamp.

3. A tool as set forth in claim 2 wherein the clamp is adjustable with respect to the member.

4. For use with a jack having a wheeled base, a vertical movable lift plate and means to raise and lower the lift plate; a portable tool for holding transversely disposed bumper components for installation to the end of an auto body, the tool comprising; a frame including outwardly diverging arms symmetrically with respect to the frame; first means carried on the frame to removably fasten said frame to the lift plate; second means adjustable along the length of each arm to hold and support a bumper component at longitudinally spaced points; third means mounted on the frame to hold and rotate a supported bumper about an axis parallel to a longitudinal axis of the bumper to adjust the attitude of said bumper.

5. For use with a jack having a wheeled base, a vertical movable lift plate and means to raise and lower the lift plate; a portable tool for holding transversely disposed bumper components for installation to the end of an auto body, the tool comprising; a frame including coplanar outwardly diverging arms; first means carried on the frame to removably fasten said frame to the lift plate; second means adjustable along the length of each arm to engage and support a bumper component at longitudinally spaced points; third means mounted on the frame to hold and rotate a supported bumper about an axis parallel to a longitudinal axis of the bumper to adjust the attitude of said bumper, said third means comprising a standard supported on the frame, a pivotable mounted member fastened adjacent the end of the standard, and means to move the mounted member radially with respect to the pivot axis.

6. A tool as set forth in claim 5 wherein the mounted member includes an interiorly threaded sleeve and an exteriorly threaded cylinder and a chain swivelly mounted to one end of the cylinder for engaging a bumper.

7. For use with a jack having a wheeled base, a vertical movable lift plate and means to raise and lower the lift plate; a portable tool for holding transversely disposed bumper components for installation to the end of an auto body, the tool comprising; a frame including coplanar outwardly diverging arms; first means carried on the frame to removably fasten said frame to the lift plates; second means adjustable along the length of each arm to engage and support the bumper component at longitudinally spaced points; said second means comprising a carrier member on each arm including a hooked portion and a depending hooked chain-receiving portion, and a hooked chain in the chain-receiving portion rigidly fastened at one end with the hook at the other end to engage the bumper; and third means mounted on the frame to hold and rotate a supported bumper about an axis parallel to a longitudinal axis of the bumper to adjust the attitude of said bumper.

8. A tool as set forth in claim 7 wherein a protective pad overlays the hooked portion and chain-receiving portion.

References Cited by the Examiner

UNITED STATES PATENTS

| | | | |
|---|---|---|---|
| 2,536,550 | 1/1951 | Hughes | 254—133 |
| 2,640,604 | 6/1953 | Curley | 214—331 |
| 2,882,012 | 4/1959 | Luna | 254—133 |
| 2,908,403 | 10/1959 | Browder. | |
| 3,030,103 | 4/1962 | Allen | 254—133 X |
| 3,040,908 | 6/1962 | Johnson. | |

HUGO O SCHULZ, *Primary Examiner.*

MARVIN A. CHAMPION, *Examiner.*